(12) United States Patent
Li

(10) Patent No.: US 9,995,993 B2
(45) Date of Patent: *Jun. 12, 2018

(54) SELFIE DEVICE

(71) Applicant: Winners' Sun Plastic & Electronic (Shenzhen) CO. LTD, Shenzhen (CN)

(72) Inventor: Zhengliang Li, ShangHai (CN)

(73) Assignee: Winners' Sun Plastic Electronic (Shenzhen) CO. LTD., Shenzhen (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/759,691

(22) PCT Filed: Nov. 12, 2014

(86) PCT No.: PCT/CN2014/090896
§ 371 (c)(1),
(2) Date: Jul. 8, 2015

(87) PCT Pub. No.: WO2016/037409
PCT Pub. Date: Mar. 17, 2016

(65) Prior Publication Data
US 2016/0252799 A1   Sep. 1, 2016

(30) Foreign Application Priority Data

Sep. 11, 2014   (CN) ............... 2014 2 0522729 U

(51) Int. Cl.
*G03B 17/00* (2006.01)
*G03B 17/56* (2006.01)
(Continued)

(52) U.S. Cl.
CPC ........ *G03B 17/561* (2013.01); *B25J 15/0019* (2013.01); *B25J 15/0095* (2013.01);
(Continued)

(58) Field of Classification Search
CPC ........ F16M 11/00; F16M 11/02; F16M 11/04; G03B 17/00; G03B 17/56
(Continued)

(56) References Cited

U.S. PATENT DOCUMENTS 4,852,924 A * 8/1989 Ines ................. A01K 23/005
                                                                 294/1.5
5,065,249 A * 11/1991 Horn ................. F16M 11/04
                                                                 348/375
(Continued)

FOREIGN PATENT DOCUMENTS

CN   201298135 Y * 8/2009
JP   08038660 A * 2/1996

*Primary Examiner* — Clayton E Laballe
*Assistant Examiner* — Fang-Chi Chang
(74) *Attorney, Agent, or Firm* — Gokalp Bayramoglu

(57) ABSTRACT

A photo shooting support device or selfie device, includes a telescopic stick and a clamping device for holding and clamping a camera device. The clamping device includes a carrier and a stretchable clamping mechanism arranged above the carrier. The clamping device is pivotally or rotatably connected to the top end of the telescopic stick. A notch is arranged on the carrier. The middle portion of the clamping mechanism is provided with a bending portion corresponding to the notch. The telescopic stick can be accommodated in the notch and the bending portion after folding. The clamping device is always rotatably connected to the top end of the telescopic stick; so it does not require temporary assembly for use, bringing great convenience to users; and after use, the telescopic stick can be directly received in the notch of the carrier and the bending portion of the clamping mechanism, so it saves space and is easy to carry.

19 Claims, 6 Drawing Sheets

(51) Int. Cl.
*B25J 15/00* (2006.01)
*G03B 17/38* (2006.01)
*F16M 11/28* (2006.01)

(52) U.S. Cl.
CPC ............ *F16M 11/28* (2013.01); *G03B 17/38* (2013.01); *G03B 17/563* (2013.01); *G03B 17/565* (2013.01)

(58) Field of Classification Search
USPC .................. 396/428, 425; 348/376; 248/689
See application file for complete search history.

(56) References Cited

U.S. PATENT DOCUMENTS

| | | | | |
|---|---|---|---|---|
| 6,692,374 B1* | 2/2004 | Colbo | .................... | A63B 47/02 294/19.2 |
| 9,170,473 B1* | 10/2015 | Li | .......................... | F16M 11/28 |
| 2013/0233986 A1* | 9/2013 | Rasheta | ............... | G03B 17/561 248/205.1 |
| 2014/0116127 A1* | 5/2014 | Christian | ................ | G01W 1/14 73/170.17 |

* cited by examiner

SELFIE DEVICE

FIELD OF THE INVENTION

The present application relates to a photo shooting support device, and more particularly to a fully integrated selfie device that does not require assembly and disassembly.

BACKGROUND

In real life, when people go to travel somewhere, they may carry a camera device to take a group photo of friends and relatives at scenic spots or to record a video as a souvenir. In order to take a group photo of all the people, generally one person will hold the camera device to take a photo reversely, that is, to take a selfie. However, since the camera is bulky and inconvenient, taking selfies requires the user to hold the camera at arm-length, so the selfie photo turns out to be blurry because the hands shake and tremble. The photo image quality may not be good. In the event of more people, it is hard to take selfies fitting in everyone's face.

Various selfie stick devices have appeared on the market. The photo image quality will be improved since the shooting range can be adjusted by regulating camera-subject distances and angles by the user holding the selfie stick device. The existing selfie stick is generally split into several discrete components to be easily carried when not in use, but assembly of the selfie stick is required for use, then disassembly is required again after use. The existing selfie stick is not fully integrated. This brings lots of inconvenience to the user. The components of the selfie stick may get damaged and deformed during repeated and frequent assembly and disassembly. And the components also tend to get lost as components are scattered.

SUMMARY

In order to overcome the aforementioned deficiencies, the present application provides an assembly-free and disassembly-free selfie device.

The selfie device according to the present application includes a telescopic stick and a clamping device for holding and clamping a camera device, wherein the clamping device includes a carrier and a stretchable clamping mechanism arranged on the carrier, and the clamping device is pivotally or rotatably connected to the top end of the telescopic stick.

In one embodiment, a notch is arranged on the carrier, the clamping mechanism is provided with a bending portion corresponding to the location of the notch, and the telescopic stick can be accommodated in the notch and the bending portion after folding.

In one embodiment, the telescopic stick comprises a plurality of telescopic sections.

In one embodiment, an upper end of the telescopic stick is provided with a connector; and the connector is integrally connected with the telescopic section on the top end of the telescopic stick.

In one embodiment, the connector is rotatably connected with the clamping device; and the rotatable connection between the connector and the clamping device can be locked by a locking device.

In one embodiment, a lower end of the telescopic stick is provided with a handheld portion, and the handheld portion is provided thereon with a shutter button.

In one embodiment, the handheld portion comprises an anti-slip area; and the anti-slip area is provided with anti-slip stripes.

In one embodiment, the bottom of the handheld portion is provided with a power switch.

In one embodiment, the bottom of the handheld portion is provided with a USB interface.

In one embodiment, an upper surface of the carrier is a curved surface with a high front end and a low rear end.

In one embodiment, the clamping mechanism is arranged above the upper surface of the carrier, and the bending portion is designed corresponding to the upper surface of the carrier; the carrier and the bending portion face each other across a distance.

In one embodiment, a handle is positioned on the bending portion and a cushion wraps the bending portion; and the cushion is integrally arranged below the handle.

In one embodiment, the handle is provided thereon with anti-slip stripes.

The beneficial effects of the present application are as follows. The clamping device is always pivotally or rotatably connected to the top end of the telescopic stick; so it does not require temporary assembly for use and brings great convenience to users; and after use, the telescopic stick can be directly received in the notch of the carrier and the bending portion of the clamping mechanism, so it saves space and is easy to carry.

BRIEF DESCRIPTION OF THE DRAWINGS

The present application will be further described below with reference to the accompanying drawings and embodiments, and wherein.

DETAILED DESCRIPTION

A preferred embodiment of the present application is now described in detail with reference to the accompanying drawings. As used to describe such embodiment, terms "upper", "lower", "front", "rear", "above", "below", "top", "bottom" and the like, may be used herein for ease of description to describe one element or feature's relationship to another element(s) or feature(s) as illustrated in the figures. Further, it will be understood that the spatially relative terms are intended to encompass different orientations of the device in use or operation in addition to the orientation depicted in the figures. Instead, such terms are merely used to identify one portion versus another portion. Accordingly, "upper" and "lower" may be equivalently interchanged with "top" and "bottom", and so on.

Figure 1:
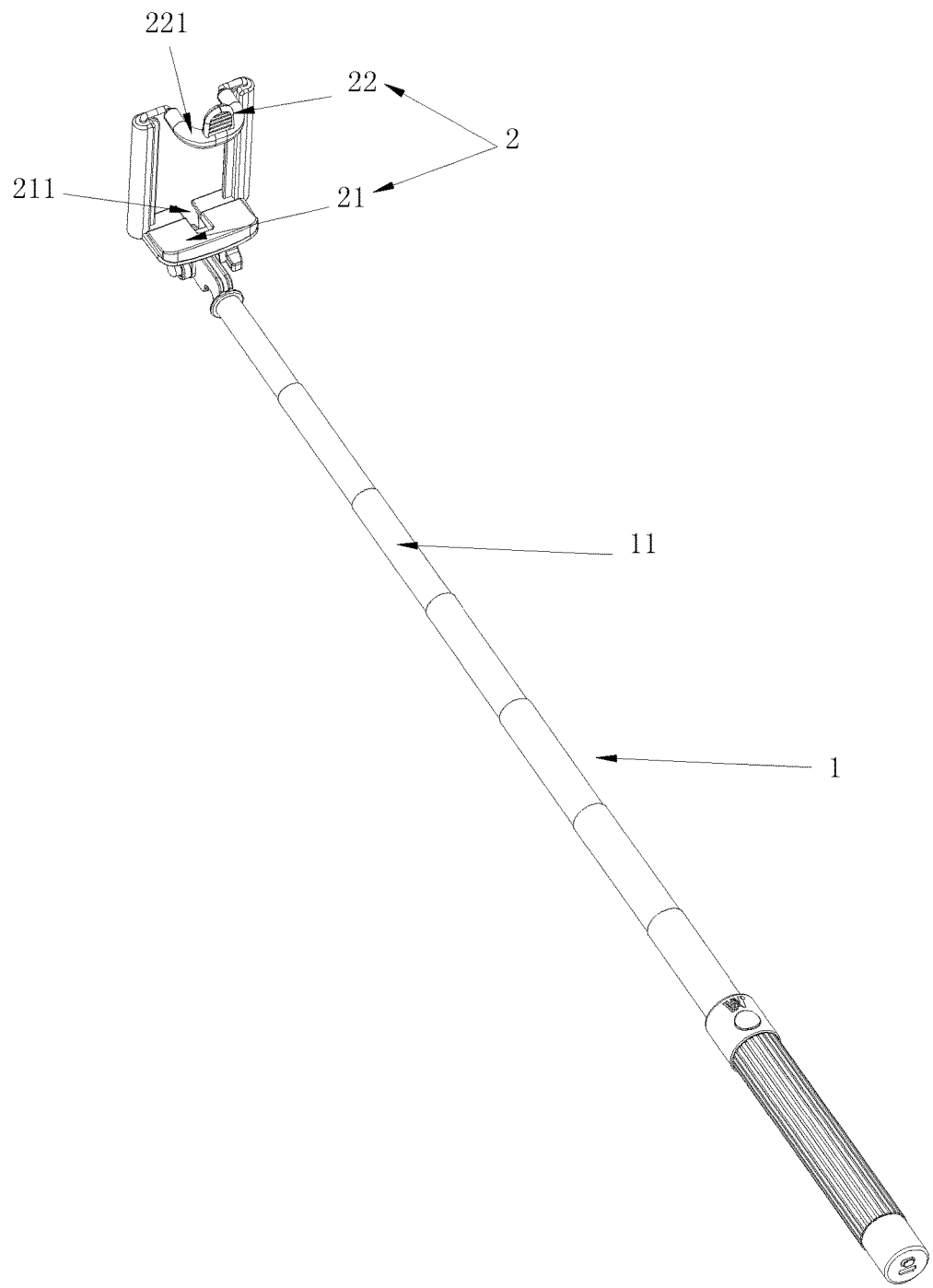
FIG. 1 is a three-dimensional schematic structural view illustrating operation of the selfie device in use according to the present application.
Figure 2:
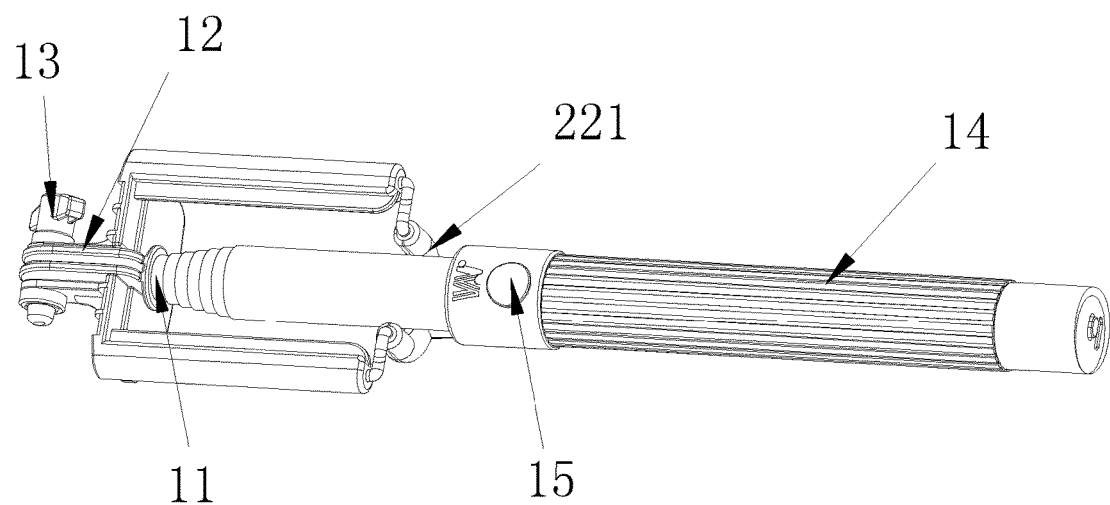
FIG. 2 is a three-dimensional schematic structural view of the selfie device after folding according to the present application.
Figure 5:
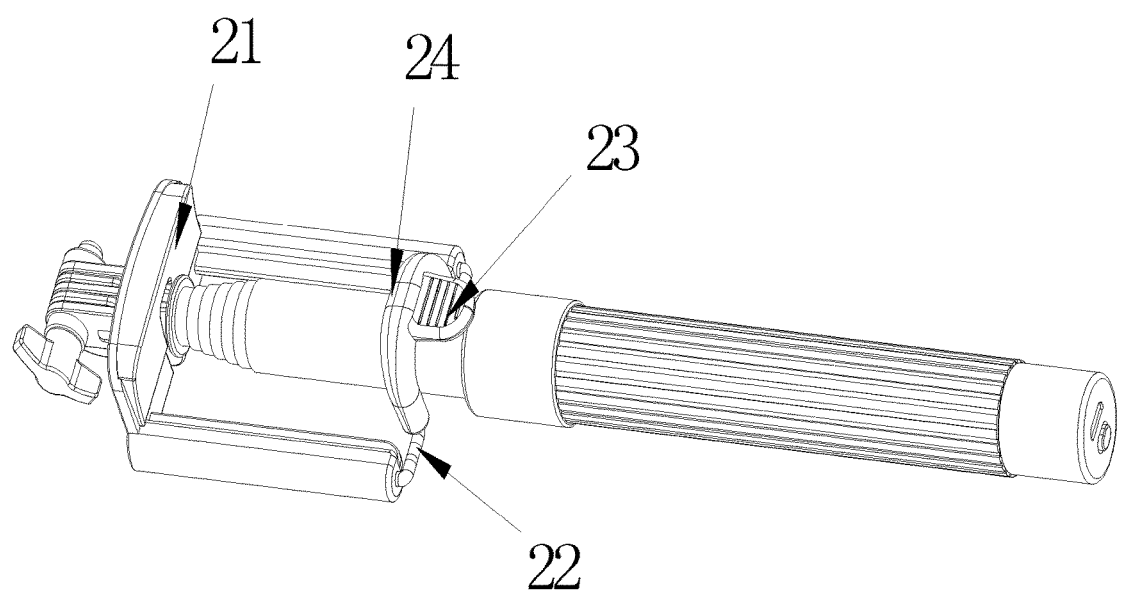
FIG. 5 is another three-dimensional schematic structural view of the selfie device after folding according to the present application.

As shown in FIG. 1, a selfie device in this embodiment includes telescopic/extendable stick 1 and clamping device 2 for holding and clamping a camera device. Clamping device 2 includes carrier 21 and stretchable clamping mechanism 22 arranged on carrier 21. Clamping device 2 is pivotally or rotatably connected to the top end of telescopic stick 1. A notch 211 is arranged on carrier 21. The middle portion of clamping mechanism 22 is provided with bending portion 221 corresponding to the location of notch 211. The telescopic stick can be accommodated in notch 211 and bending portion 221 after folding. Specifically, when not in use, telescopic stick 1 is rotated in a direction which makes telescopic stick 1 to be received into notch 211 and bending portion 221 (that is, after retracting, telescopic stick 1 is folded to the location of notch 211 and bending portion 221), as shown in FIG. 2 and FIG. 5. When in use, telescopic stick 1 is rotated out from notch 211 and bending portion 221. Clamping device 2 is always rotatably connected to the top end of telescopic stick 1; so it does not require temporary assembly for use and brings great convenience to users; and after use, telescopic stick 1 can be directly received in notch 211 of carrier 21 and bending portion 221 of clamping mechanism 22, so it saves space and is convenient and easy to carry. Further, telescopic stick 1 includes a plurality of telescopic sections 11. When using the selfie stick device, telescopic stick 1 can be extended to an appropriate length by extending telescopic sections 11, to keep the camera device held to clamping device 2 at a certain distance from a user. The number of telescopic sections 11 is greater than one. Furthermore, the selfie device in this embodiment further includes a remote control component, to control the camera device through a wireless connection between the remote control component and the camera device. The wireless connection may be wifi, Bluetooth or any other wireless connections.

Figure 3:
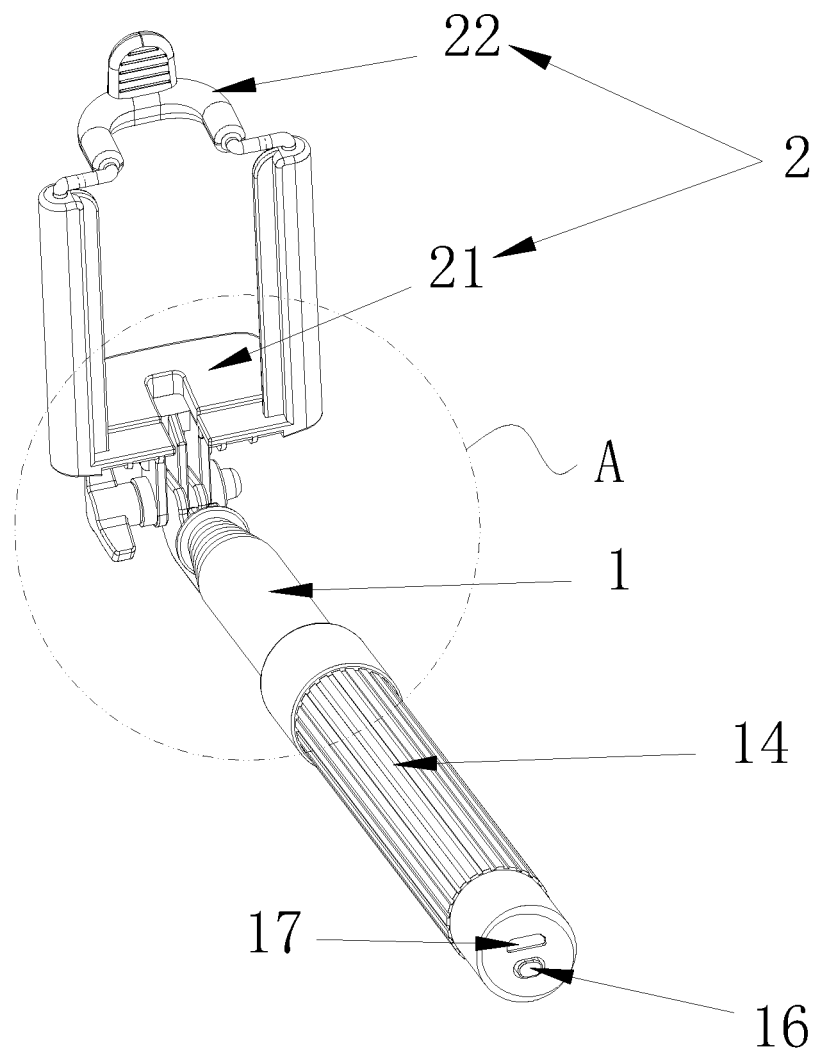
FIG. 3 is a three-dimensional schematic structural view illustrating another operation of the selfie device in use according to the present application.
Figure 4:
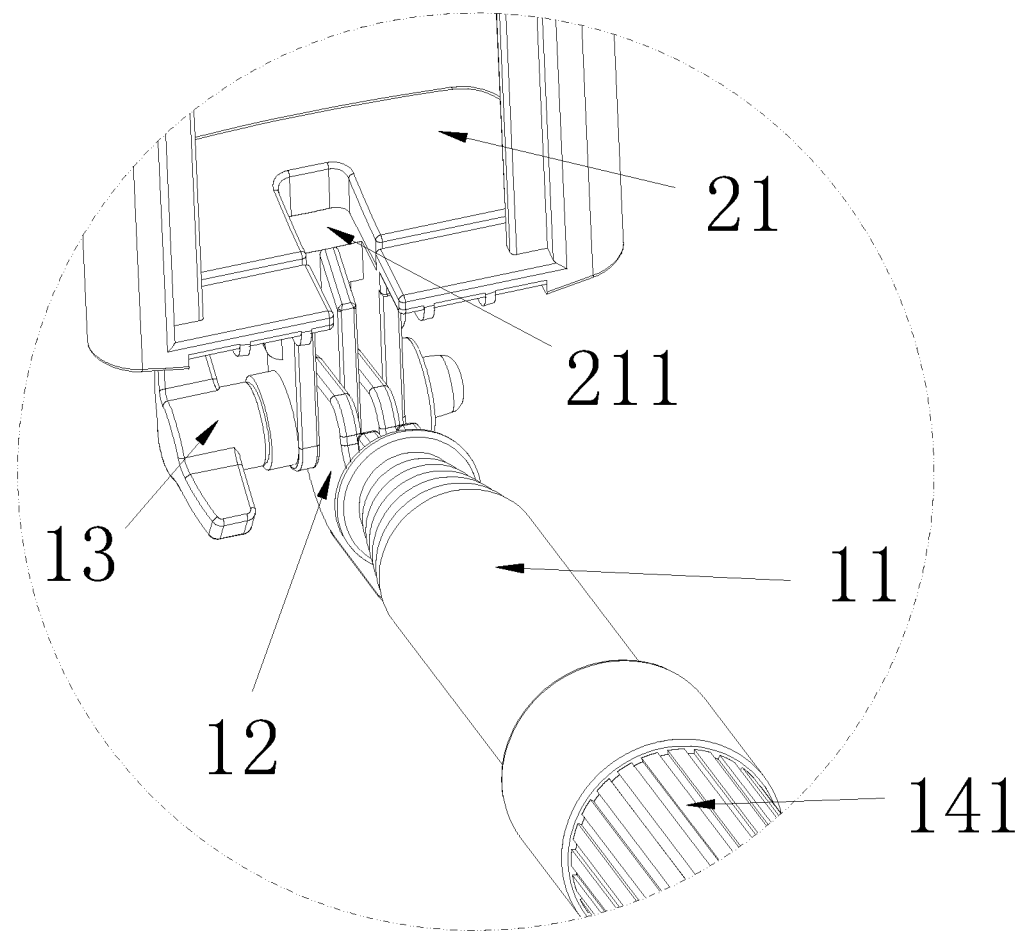
FIG. 4 is an enlarged schematic view of Position A in FIG. 3.

As shown in FIGS. 2-4, an upper end of telescopic stick 1 in this embodiment is provided with connector 12. Connector 12 is integrally connected with telescopic section 11 on the top end of telescopic stick 1. Connector 12 is pivotally or rotatably connected with clamping device 2, and the rotatable connection between connector 12 and clamping device 12 can be locked by locking device 13. The rotatable connection is preferably a hinged connection. Specifically, when the selfie stick device is not in use, connector 12 can be received at the location of notch 211 of carrier 21, and at this point, the recess of bending portion 211 does just accommodate the telescopic stick 1 (shown in FIG. 2 and FIG. 5), thus the selfie stick device will not occupy extra space, and does not require assembly and disassembly, and is very easy to carry. Locking device 13 is not only used to lock connector 12 and clamping device 2, but also serves as a rotating shaft between connector 12 and clamping device 2. The photo shooting angle of the camera device can be adjusted due to setting a hinge structure between connector 12 and clamping device 2, so as to achieve a better image quality. Furthermore, a lower end of telescopic stick 1 is provided with handheld portion 14. And handheld portion 14 is provided thereon with shutter button 15. Handheld portion 14 includes anti-slip area 141. Anti-slip area 141 is provided with anti-slip stripes or other kinds of anti-slip structure. Specifically, shutter button 15 is arranged on the front end of anti-slip area 141, so that the user can easily have his thumb over shutter button 15 when holding anti-slip portion 141 and taking photos. Further, some other remote control components are deployed inside handheld portion 14, and shutter button 15 is just one part of the remote control components. The bottom of handheld portion 14 is provided with power switch 16, and power switch 16 is used to switch on and off power supply of the remote control components. That power switch 16 is arranged at the bottom of handheld portion 14 can prevent incorrect operation by the user during photo taking. Further, the bottom of handheld portion 14 is also provided with USB interface 17. USB interface 17 is electrically connected with a circuit board of the remote control components, to achieve data exchange between the remote control components and a computer, or software update for the remote control components. And a battery in the remote control components can be charged through USB interface 17.

Figure 6:
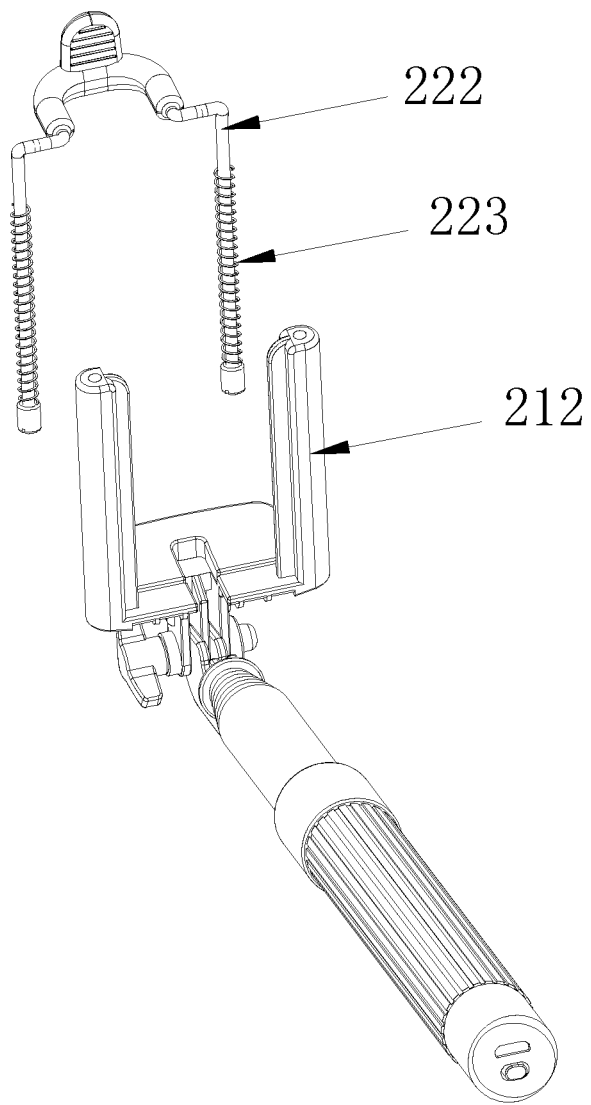
FIG. 6 is a partially exploded schematic structural view of the selfie device according to the present application.

As shown in FIGS. 1 to 6, an upper surface of carrier 21 in this embodiment is a curved surface with a high front end and a low rear end. Clamping mechanism 22 is arranged above the upper surface of carrier 21, and bending portion 221 is designed corresponding to the upper surface of carrier 21. Carrier 21 and bending portion 221 face each other across a distance. Specifically, two supporting arms 212 are arranged in the rear end of the upper surface of carrier 21. Clamping mechanism 22 includes movable rod 222 and elastic element 223. Movable rod 222 is folded to an inverted U-shape. Two legs of the inverted U-shaped movable rod are respectively stretchably inserted into two supporting arms 212. Bending portion 221 is arranged in the middle portion of movable rod 222 and bending portion 221 is located above the upper surface of carrier 21. Bending portion 221 and two legs constitute one-piece integrally-formed movable rod 222. Handle 23 with anti-slip stripes is positioned on bending portion 221 and cushion 24 wraps bending portion 221. Elastic element 223 is arranged between movable rod 222 and supporting arms 212. Further, elastic element 223 and two legs of movable rod 222 are arranged in inner cavities of supporting arms 212, and the two ends of elastic element 223 respectively abut against one end of movable rod 222 and one end of supporting arms 212, as shown in FIG. 6. Therefore, movable rod 222, supporting arms 212 and elastic element 223 form a stretchable mechanism. Elastic element 223 is preferably a spring. When in use, handle 23 is manually pulled upwards to drive movable rod 222 to move upwards, causing the distance between carrier 21 and cushion 24 to increase. When the distance is greater than the size of the camera device, the camera device is placed on carrier 21. After movable rod 222 is loosened, elastic element 223 between movable rod 222 and supporting arms 212 drives movable rod 222 to move down, so as to clamp the camera device.

It should be understood that the above embodiment is only intended to describe the technical solution of the present application, instead of making limitations thereto. Those skilled in the art can make amendments to the technical solution disclosed in the above embodiment, or make equivalent replacements to some technical features therein; and all the amendments and replacements should fall within the scope of the appended claims of the present application.

What is claimed is:
1. A selfie device, comprising:
   a telescopic stick, and
   a clamping device for holding and clamping a camera device, wherein the clamping device comprises:
   a carrier having a front end and an opposing rear end, and
   a stretchable clamping mechanism arranged above the carrier;
   wherein a top end of the telescopic stick is pivotally or rotatably connected to a bottom surface of the clamping device;

wherein a notch is arranged on the carrier, the clamping mechanism is provided with bending portion corresponding to a location of the notch, and the telescopic stick is able to be accommodated in the notch and the bending portion after folding and locates between the front end and the rear end of the carrier;

wherein when in use, the telescopic stick is rotated out from the notch and the bending portion.

2. The selfie device according to claim 1, wherein the telescopic stick comprises a plurality of telescopic sections.

3. The selfie device according to claim 2, wherein an upper end of the telescopic stick is provided with a connector; and the connector is integrally connected with the telescopic section on the top end of the telescopic stick.

4. The selfie device according to claim 3, wherein the connector is rotatably connected with the clamping device, and the rotatable connection between the connector and the clamping device is able to be locked by a locking device.

5. The selfie device according to claim 2, wherein a lower end of the telescopic stick is provided with a handheld portion; and the handheld portion is provided thereon with a shutter button.

6. The selfie device according to claim 5, wherein the handheld portion comprises an anti-slip area; and the anti-slip area is provided with anti-slip stripes.

7. The selfie device according to claim 6, wherein the bottom of the handheld portion is provided with a USB interface.

8. The selfie device according to claim 5, wherein the bottom of the handheld portion is provided with a power switch.

9. The selfie device according to claim 1, wherein an upper surface of the carrier is a curved surface with a high front end and a low rear end.

10. The selfie device according to claim 9, wherein the clamping mechanism is arranged above the upper surface of the carrier, and the bending portion is designed corresponding to the upper surface of the carrier; the carrier and the bending portion face each other across a distance.

11. The selfie device according to claim 10, wherein a handle is positioned on the bending portion and a cushion wraps the bending portion; and the cushion is integrally arranged below the handle.

12. The selfie device according to claim 11, wherein the handle is provided thereon with anti-slip stripes.

13. A photo-shooting support device comprising:
a telescopic stick; and
a clamping device for holding and clamping a camera device, wherein the clamping device comprises:
  a carrier having a front end and an opposing rear end, and
  a stretchable clamping mechanism arranged above the carrier;

wherein a top end of the telescopic stick is pivotally connected to a bottom surface of the clamping device;
wherein a notch is formed on the carrier, wherein the clamping mechanism is provided with a bending portion corresponding to a location of the notch,
wherein the telescopic stick is able to be accommodated in the notch and the bending portion after folding and locates between the front end and the rear end of the carrier; and
wherein when in use, the telescopic stick is rotated out from the notch and the bending portion.

14. The photo-shooting support device of claim 13, wherein the telescopic stick comprises a plurality of telescopic sections.

15. The photo-shooting support device of claim 14 further comprising: a connector attached to an upper end of the telescopic stick and to a telescopic section on the top end of the telescopic stick.

16. A selfie device, comprising:
a telescopic stick, and
a clamping device being pivotally or rotatably connected to a top end of the telescopic stick in an integrated manner for holding and clamping a camera device, wherein the clamping device comprises:
  a carrier having two ends, and
  a stretchable clamping mechanism arranged above the carrier, wherein the stretchable clamping mechanism includes:
    two supporting arms arranged at the two ends of the carrier, and
    a movable rod, wherein the movable rod has:
      two legs parallel to each other and stretchably inserted into two supporting arms, and
      a bending portion connecting the two legs,
wherein the carrier forms a notch oriented toward a plane defined by the two legs,
wherein the bending portion forms an opening oriented toward the plane,
wherein the telescopic stick is able to be accommodated in the notch and the opening after folding;
wherein when in use, the telescopic stick is rotated out from the notch and the bending portion.

17. The selfie device according to claim 16, wherein the telescopic stick comprises a plurality of telescopic sections.

18. The selfie device according to claim 17, wherein an upper end of the telescopic stick is provided with a connector; and the connector is integrally connected with the telescopic section on the top end of the telescopic stick.

19. The selfie device according to claim 18, wherein the connector is rotatably connected with the clamping device; and the rotatable connection between the connector and the clamping device is able to be locked by a locking device.

* * * * *